Dec. 11, 1923.
G. M. FAULK
1,477,050
OVEN
Filed Aug. 18. 1922
2 Sheets-Sheet 2
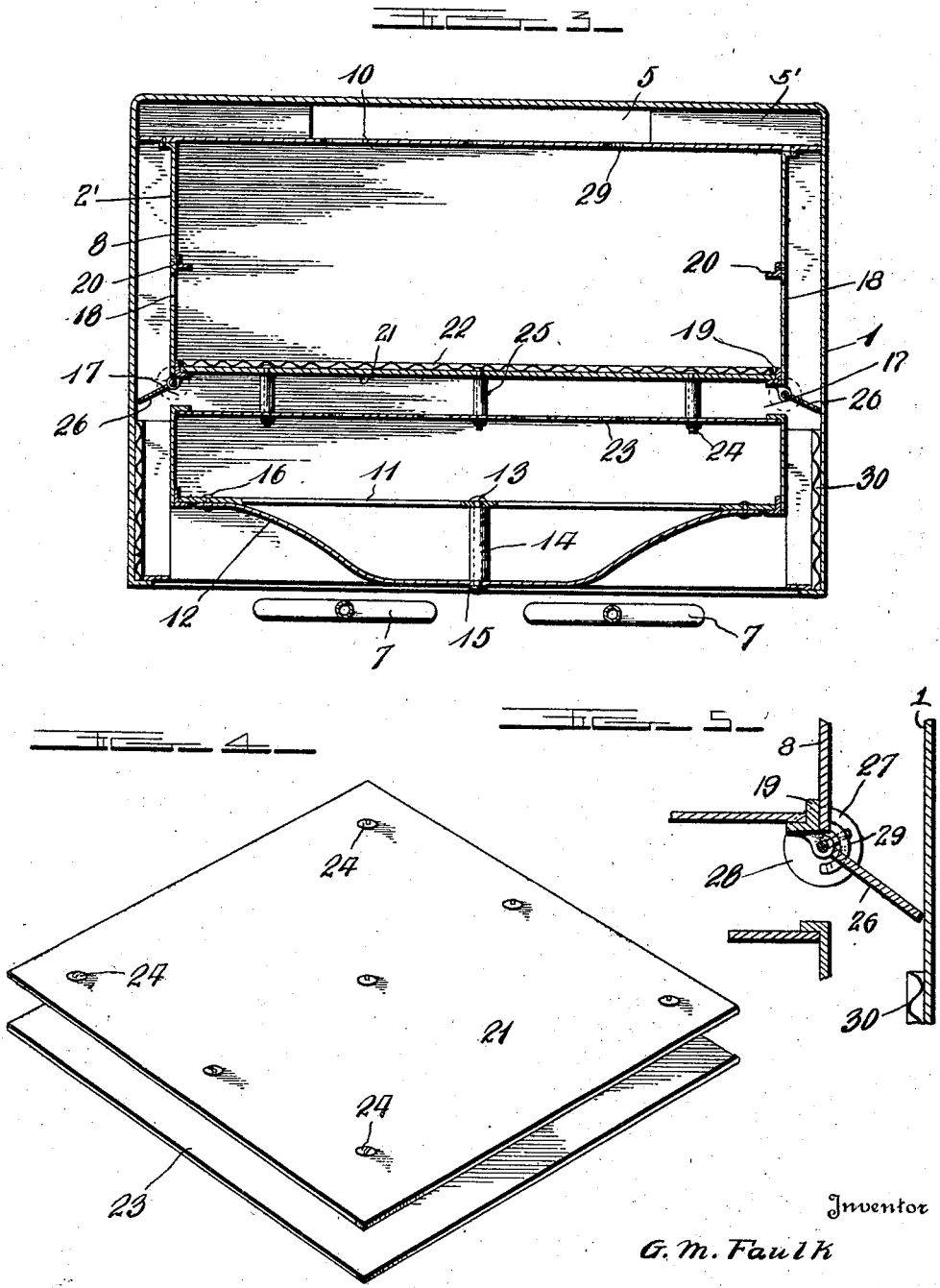

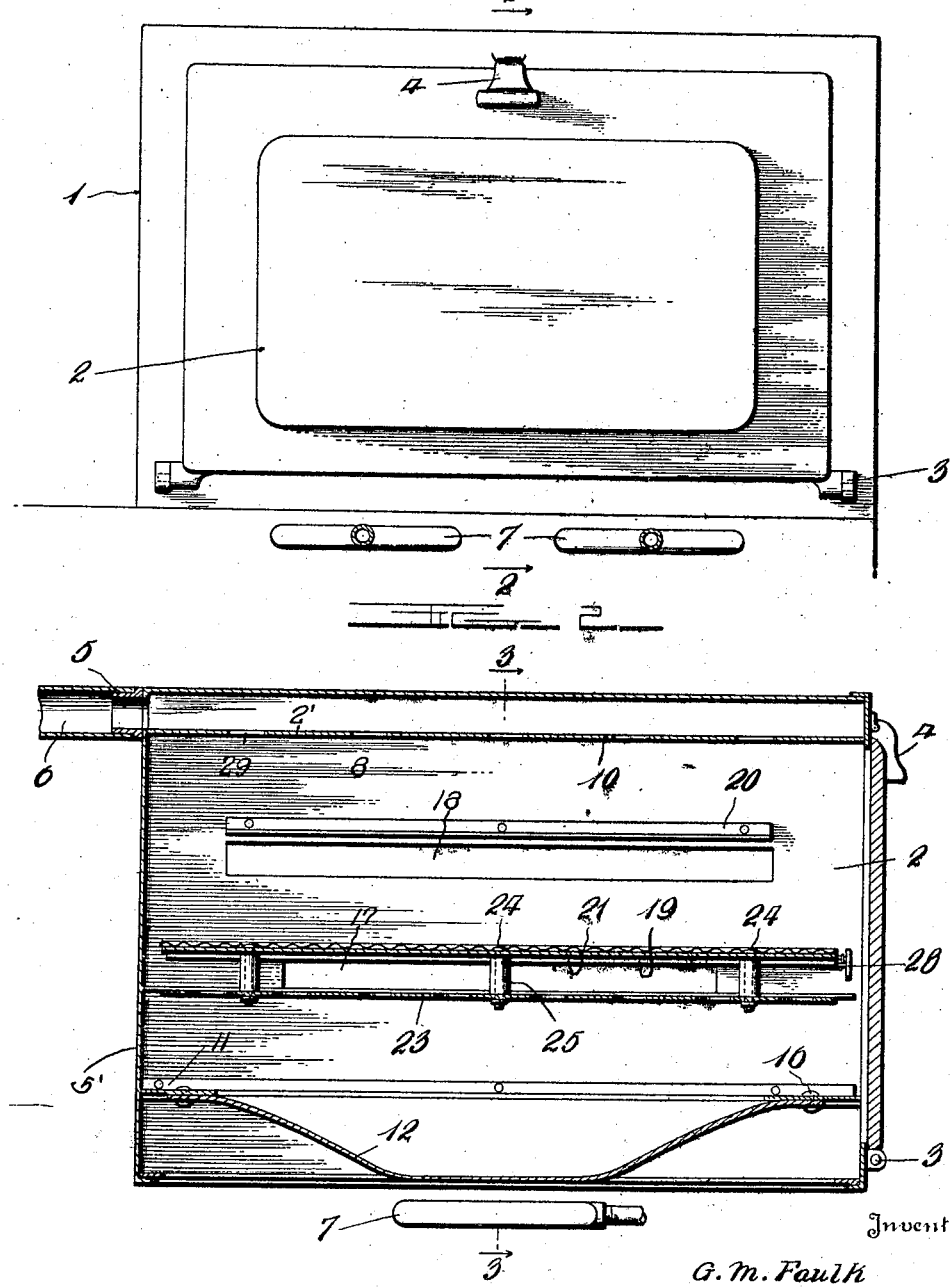

Patented Dec. 11, 1923.

1,477,050

UNITED STATES PATENT OFFICE.

GEORGE MILTON FAULK, OF RUSTON, LOUISIANA.

OVEN.

Application filed August 18, 1922. Serial No. 582,755.

*To all whom it may concern:*

Be it known that I, GEORGE M. FAULK, a citizen of the United States of America, residing at Ruston, in the parish of Lincoln and State of Louisiana, have invented certain new and useful Improvements in Ovens; and I do hereby declare that the following is a full, clear, concise, and exact description of the invention, such as will enable others skilled in the art to which it appertains to make and use the same.

This invention relates to improvements in ovens, having for an object to provide an oven so arranged and constructed as to provide a plurality of baking chambers about which the heated air is adapted to be selectively circulated so as to permit of fast baking or browning of bread or other foodstuffs therein in one of such chambers, or slow baking in the other of the chambers, or slow baking in each of the chambers, said circulation of the heated medium being minutely regulatable by a user in order that the proper temperature in the several chambers may be readily attained.

It is also an object of the invention to provide an oven having the partition and supporting walls thereof constructed in a manner such as will permit the circulation of heated air through the same and the discharge of said air into the upper portion of the fast baking chamber or the partial passage of this heated air through the fast baking chamber and the remainder along the sides and top walls of the slow baking chamber.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same:

In these drawings:

Figure 1 is a front elevation of the improved oven showing the arrangement of the burners with relation to the bottom of the same and the arrangement of the door thereof;

Figure 2 is a vertical longitudinal section taken on the line 2—2 of Figure 1;

Figure 3 is a vertical transverse section taken on the line 3—3 of Figure 2 looking in the direction in which the arrows point;

Figure 4 is a detail in perspective of one of the partitions employed in connection with the secondary casing of the oven; and, Figure 5 is an enlarged fragmentary detail in section showing the mounting of one of the temperature regulating dampers of the several baking chambers.

Having more particular reference to the drawings, in connection with which like characters of reference will designate corresponding parts throughout, the improved oven may be stated to comprehend a substantially rectangular or similar shaped sheet metal main or primary casing generally indicated by the numeral 1, the forward wall thereof being open and adapted to be closed through the medium of a vertically swinging door 2 hinged to the lower portions of said main casing as indicated at 3 and provided at its upper portion with a suitable latching or locking element 4, while an outlet port or flue 5 is formed in the upper portion of the rearward wall 5' of said casing and is adapted to be connected with a suitable discharge pipe such as indicated at 6, for an obvious purpose. Burners of liquid or gaseous fuel type indicated by the numeral 7 are adapted to be arranged beneath the bottom or lower wall of the primary casing 1 and are provided with suitable regulating valves or like control devices, not shown.

Received in the primary casing 1 is a secondary casing generally indicated by the numeral 2', the same comprising side walls 8, and a top wall 10; the forward end of the secondary casing being open and corresponding to the forward portion of the primary casing 1, whereby it may be closed by the vertically swinging door 2. A bottom wall 11 of the secondary casing receives adjacent its under side a heat deflecting element or fire pan 12, which as will be noted, has the outer portion thereof curved, whereby to provide a continuous pocket as between the lower marginal portion of the primary casing 1 and the outer marginal portions of the bottom 11. This fire pan 12 may be and preferably is secured to the bottom 11 of the secondary casing 2' through the medium of a concentrically located bolt 13 adapted to pass through a spacing sleeve 14 positioned between said pan 12 and the bottom 11 as shown in the Figure 3, while the lower screw threaded end thereof receives a suitable locking nut 15 on the same for an obvious purpose. The outer marginal portions of the fire pan may be secured to the adjacent portions of the bottom 11 by means of metal screws, rivets, or other suitable fastening devices, such as indicated at 16.

The opposite side walls 8 of the secondary casing 2' are provided with series of horizontally arranged ports indicated at 17 and 18, said ports 17 and 18 being elongated as shown in the Figure 2.

A plurality of pairs of horizontally arranged longitudinally disposed angle iron supporting strips 19 and 20 are secured to the inner sides of the side walls 8 of the secondary casing 2'; the arrangement of the supporting strips 19 being slightly above the horizontal elongated ports 17 therein. Removably received upon the pairs of supporting strips indicated at 19 is a sheet metal partition wall 21 having a covering of sheet asbestos 22 thereon and adapted to divide the secondary casing 2' into upper and lower or slow and fast baking chambers respectively. In this connection, it is to be noted that the elongated ports 18 are adjacent the upper or slow baking chamber of the oven, while the lower ports 17 are adjacent the upper portion of the lower or fast baking chamber.

To ensure proper distribution of heated air in and through the lower or fast baking chamber of the oven, there is provided a perforated baffle or partition wall 23, the same being arranged directly below the partition wall 21 and being secured thereto through the medium of bolts 24 passing through suitable spacing sleeves 25 interposed therebetween, as shown in the Figure 3. Thus, it will be noted that the arrangement of the perforated baffle 23 with relation to the partitioned wall 21 is such as to provide a circulating way or space between the same, which latter communicates directly with the elongated ports 17. Therefore, with the passage of heated air through said ports 17, the same will enter the space between the partition wall 21 and the baffle 23, whereupon it will pass through the perforations in said baffle downwardly into the lower or fast baking chamber of the oven.

In order that the circulation of heated air may be controlled through or by the ports 17 at will of an operator whereby the desired temperature in either of the several chambers may be attained, I provide a plurality of substantially rectangular dampers 26, pivoting the same at their opposite ends in brackets 27 secured to the adjacent portions of the lower supporting strips 19 as shown in the Figure 5 and fixedly mounted upon their outer ends handles 28 whereby they may be conveniently rotated or adjusted to the desired positions. Pawl and ratchet devices 29 may be and preferably are arranged adjacent the handles 28 and as will be understood, serve as effectual means for releasably retaining said dampers 26 in their adjusted positions.

The upper or top wall 10 of the secondary casing 2' is provided with a plurality of perforations, generally indicated by the numeral 29, which as will be understood, will serve to permit of ingress and egress of heated air to and from the upper or slow baking chamber and the subsequent exhaustion of such heated air from the flue opening 5 into the discharge pipe 6.

If desired, the lower portions of the inner sides of the side walls of the primary casing 1 may be lined with asbestos, such as indicated at 30, whereby the lower or fast baking chamber will be provided with a more positive or effectual heat insulation and in consequence, permit of the rapid rise of temperature therein until the desired baking has been attained therein.

In using the improved oven, access may be had to the slow or fast baking chambers by way of the vertical swinging hinged door 2. Should it be desired to employ the fast baking or lower chamber, the several dampers 26 are swung to their outermost positions as shown in the Figure 3. In these positions, the dampers will afford effectual checks against the passage of air throughout the full area or space between the opposite side walls of the primary and second casings 1 and 2', shunting such air in its entirety through the lower ports 17 into the space or way provided between the partition wall 21 and the perforated baffle 23. The shunted heated air will then pass downwardly through the perforations in the perforated baffle 23 into the fast baking chamber, thus permitting of rapid baking and browning of the bread or similar foodstuff arranged therein upon its bottom 11. Furthermore, due to the juxtapositioning of the fire pan 12 with relation to the bottom 11 of the secondary casing, it will be understood that said lower or fast baking chamber may be rapidly brought to the proper baking temperature, such attainment of temperature in the lower chamber being further enhanced by the provision of the heat insulating sheets of asbestos 30. The marginally arranged pocket afforded by the curvature of the fire pan 12, likewise, will afford an effectual means for trapping the heated air from the burners 7 and permitting the direct transmission of heat to the lower portions of the side walls 8 of the secondary chamber 2'.

Should it now be desired to utilize the upper or slow baking chamber of the oven, the dampers 26 are swung to their innermost or substantially vertical positions through the medium of their respective operating handles 28, thus closing the ports 17 and causing the heated air circulating between the spaced side walls of the primary and secondary casings to move upwardly therebetween and to discharge by way of the elongated upper ports 18 into the upper or slow baking chamber.

Of course, the adjustment of the dampers 26 may be varied to any degree or position, in order that the desired temperature in either the slow or fast baking oven chambers may be attained. The heated air circulating through the several chambers of the oven will be discharged by way of the inner casing 2′ into and through the discharge or outlet port 5, whereupon it will be conveyed by the pipe or flue 6 into the atmosphere.

The upper pair of horizontal supporting strips 20 obviously, will permit of the arrangement of the supporting shelf in the upper or slow baking chamber, should such be desired.

Manifestly, the construction shown is capable of considerable modification and such modification as is within the scope of my claims, I consider within the spirit of my invention.

I claim:

1. An oven comprising a primary casing having an outlet port in its rear wall, a secondary casing therein having its side and top walls spaced from the adjacent walls of the first casing and its front wall open, the side walls of said secondary casing having upper and lower ports therein, a horizontally arranged partition and bottom supported in the secondary casing, said partition dividing the secondary casing into a pair of baking chambers and being arranged above the lower ports in said secondary casing, and dampers positioned between the opposite side walls of said primary and secondary casings for controlling the circulation of heated air through and by said lower ports in the secondary casing.

2. An oven comprising a primary casing having an outlet port in its rear wall, a secondary casing therein having its side and top walls spaced from the adjacent walls of said primary casing and its front wall open, the side walls of said secondary casing having a plurality of pairs of elongated horizontally disposed upper and lower ports therein, a bottom for the secondary casing, a horizontally arranged partition supported in the secondary casing dividing the same into a pair of chambers, said partition being arranged above the lower pair of ports, and substantially rectangular shaped dampers pivotally mounted in the space between the opposite side walls of the primary and secondary casings for controlling the circulation of heated air by and through said lower ports in the secondary casing.

3. An oven comprising a casing having an outlet port in its rear wall, a secondary casing therein having its side and top walls spaced from the adjacent walls of the first casing and its front wall open, the top wall thereof being perforated and the side walls of the same having a plurality of pairs of elongated horizontally disposed upper and lower ports formed therein, a bottom for the secondary casing, a horizontally arranged partition supported in said secondary casing dividing the same into upper and lower chambers, said partition being arranged directly above the lower pair of ports in the secondary casing, a fire pan having the outer marginal portions thereof curved upwardly and secured to the bottom of said secondary casing, and dampers adjacent the secondary casing side walls for controlling the circulation of heated air through or by said lower pair of ports in the same.

4. An oven comprising a casing having an outlet port in its rear wall, a secondary casing therein having its side and top walls spaced from the adjacent walls of said first casing and its front wall open, a door for closing said open front wall of said secondary casing, the top wall of the secondary casing being perforated and the opposite side walls thereof having a plurality of pairs of elongated horizontally arranged upper and lower ports therein, a bottom for the secondary casing, a horizontally arranged partition supported in said secondary casing dividing the same into upper and lower baking chambers, said partition being arranged directly above the lower pair of ports, a perforated baffle connected to and spaced from the under side of said partition wall arranged directly adjacent the lower portions of said lower pair of ports, a fire pan secured to the under side of the bottom of the secondary casing, and dampers pivotally mounted between the opposite side walls of said primary and secondary casings adapted to control the circulation of heated air through or by said lower pair of ports in the secondary casing.

In witness whereof I have hereunto set my hand.

GEORGE MILTON FAULK.